March 5, 1935.                C. B. CARSON                1,993,594
THERMOMETER
Filed March 29, 1933
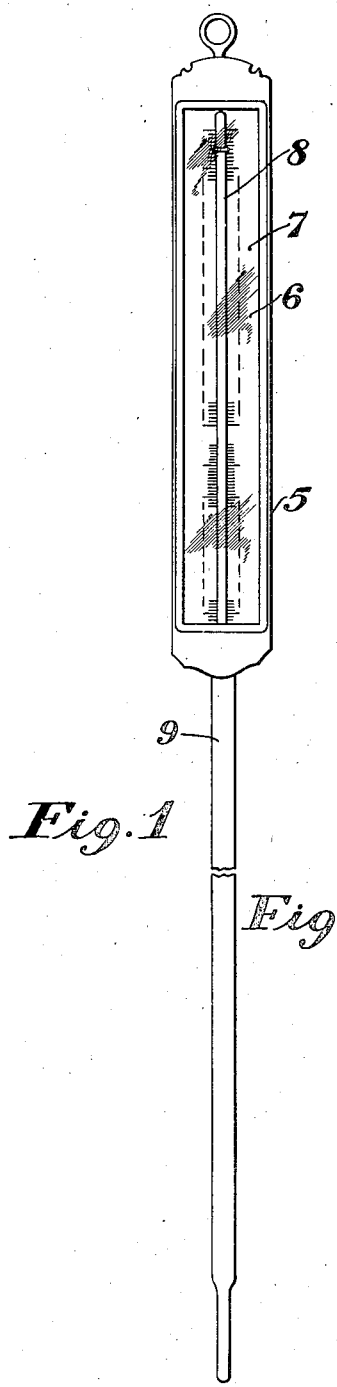
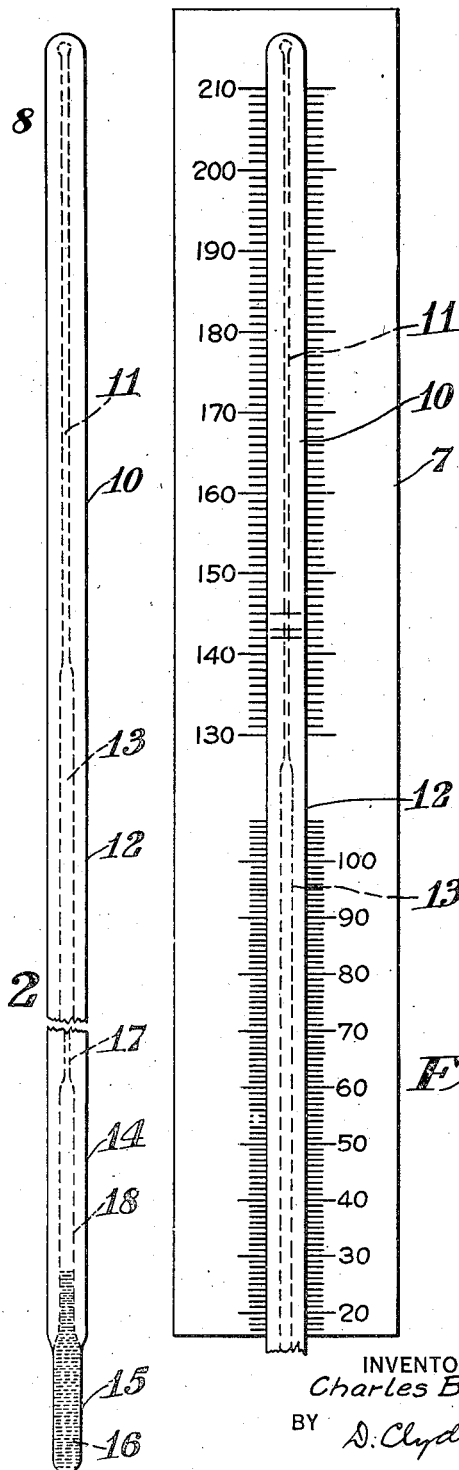
INVENTOR
Charles B. Carson
BY D. Clyde Jones
ATTORNEY Patented Mar. 5, 1935

1,993,594

UNITED STATES PATENT OFFICE 1,993,594

THERMOMETER

Charles B. Carson, Rochester, N. Y., assignor to Taylor Instrument Companies, Rochester, N. Y., a corporation of New York Application March 29, 1933, Serial No. 663,360

2 Claims. (Cl. 73—52)

This invention relates to thermometers and more particularly to thermometers for use in the dairy industry.

In accordance with the requirements of the health authorities of various States and municipalities dairy thermometers, which are used to indicate pasteurizing temperatures, must have a scale graduated in single degree divisions of not less than $\frac{1}{16}$ of an inch spacing throughout the range from 130° F. to 210° F. However, a dairy thermometer for universal use should indicate temperatures below 130° F., preferably as low as 20° F.

In order to provide a thermometer which complies with requirements of the health authorities as to the range between 130° F. and 210° F., and which also indicates temperatures as low as 20° F. while keeping the length of the complete scale within a maximum limit of ten inches, it is necessary to condense the scale below the 130° F. range. In order to condense this portion of the thermometer scale, it has been proposed to provide an expansion chamber in an intermediate portion of the indicating bore of the thermometer tube, but the use of such an expansion chamber has proved to be highly undesirable since it tends to cause the separation of the mercury column during shipment, a condition which is highly undesirable both to the manufacturer and to the user.

In order to obtain the advantages of a dual range thermometer and yet obviate the disadvantages of an expansion chamber intermediate of the ends of the bore, the present thermometer has been provided in which the main feature includes a thermometer tube made with indicating sections having bores therein of different diameters.

Another feature of this invention relates to a composite thermometer tube made of indicating sections having bores of different diameters, with said sections fused end to end so that said bores communicate with each other.

For a clearer understanding of the invention reference is made to the drawing in which Fig. 1 is a front view, partly broken away, of the thermometer of the present invention; Fig. 2 is a view of a thermometer tube for such a thermometer with a part thereof broken away; and Fig. 3 is a front view of a graduated scale plate and of the upper portion of the thermometer tube associated therewith, suitable for use in the thermometer of Fig. 1.

Referring to Fig. 1, 5 designates a thermometer scale casing having an opening in its front which is protected by a glass window 6. Within the case there is provided a graduated scale plate 7 with two groups of graduations thereon, the graduations of the upper group being more widely spaced than the graduations of the lower group. In front of this scale plate the upper or indicating end of the thermometer tube is mounted. The lower end of this thermometer tube projects through the bottom of the scale case into a protecting stem 9 which is attached to the lower end of the scale case in any preferred manner. It will be understood that the invention is not limited to the arrangement just referred to, but may assume any desired construction.

The visible portion of thermometer tube 8, however, includes an upper indicating section 10 having a bore 11 of relatively small diameter, and a lower indicating portion 12 having a relatively large bore 13 which communicates with the bore 11. In addition, the tube has a concealed section 14 joined to the lower end of section 12. The section 14 which is provided with a bore of standard construction, terminates in a bulb 15 containing a temperature-responsive liquid 16, which is preferably mercury. As herein illustrated, that portion 18 of the bore in section 14 which opens directly into bulb 15 is of relatively large diameter, while the remaining portion 17 of the bore concealed within the stem 9 is of relatively small diameter, known in the art as marine bore.

In practice, the tube 8 is a composite tube formed by heating the ends of sections of capillary tubes having bores of the different diameters required and joining these tube sections end to end while hot. The section 12 of the thermometer tube should preferably have a bore of such a diameter that it will cover a range of temperatures from 17° F. to 111° F., whereas the section 11 of the tube should have a bore of such diameter that it will cover a range of temperatures from 130° F. to 210° F. It will be noted that this last-mentioned range of the thermometer indicates a change of temperature in single degree divisions which are not less than $\frac{1}{16}$ of an inch in spacing.

From the foregoing it will be understood that a thermometer is provided which not only complies with the requirements of various health codes but, in addition, is suitable for the various uses to which a thermometer may be put in the dairy industry.

I claim:

1. In a thermometer, a scale plate having an upper section in which the graduations are widely spaced apart and a lower section in which the graduations are less widely spaced apart, a thermometer tube parallel to and adjacent said scale plate, the portion of the tube adjacent the upper section of the scale plate having a small bore and the portion of said tube adjacent the lower section of the scale plate having a relatively large bore, the junction between said large bore and said small bore being without an expansion chamber or a constriction, and a bulb containing an expansible liquid communicating with said large bore.

2. In a thermometer, a transparent tube having a bore therein, the indicating sections of said bore being of different diameters, the junction of said indicating sections of bore being without an expansion chamber or a constriction, a bulb adjacent to and communicating with that section of the bore having the larger diameter, a temperature responsive liquid in said bulb, and two groups of graduations related to said bore, the graduations of the group adjacent the smaller bore section being more widely spaced than the group of graduations adjacent said larger bore section.

CHARLES B. CARSON.